United States Patent
Ding et al.

(10) Patent No.: US 12,462,609 B1
(45) Date of Patent: Nov. 4, 2025

(54) SYSTEMS AND METHODS FOR PRIVACY-AWARE WEAPON ANOMALY DETECTION VIA INTEGRATED OBJECT RECOGNITION AND SKELETAL MOTION ANALYSIS

(71) Applicants: Liwei Ding, Miami, FL (US); Mohammadhadi Amini, Miami, FL (US)

(72) Inventors: Liwei Ding, Miami, FL (US); Mohammadhadi Amini, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/271,242

(22) Filed: Jul. 16, 2025

(51) Int. Cl.
*G06V 40/20* (2022.01)
*G06V 10/26* (2022.01)
*G06V 10/764* (2022.01)
*G06V 20/52* (2022.01)
*G06V 40/10* (2022.01)

(52) U.S. Cl.
CPC .............. *G06V 40/20* (2022.01); *G06V 10/26* (2022.01); *G06V 10/764* (2022.01); *G06V 20/52* (2022.01); *G06V 40/10* (2022.01)

(58) Field of Classification Search
None
See application file for complete search history.

(56) References Cited

U.S. PATENT DOCUMENTS

| | | | |
|---|---|---|---|
| 11,335,126 B1 * | 5/2022 | Merchant | G06T 5/70 |
| 2024/0354446 A1 * | 10/2024 | Assouad | G16H 40/67 |
| 2025/0182450 A1 * | 6/2025 | Savvides | G06V 10/82 |

OTHER PUBLICATIONS

"Weapon operating pose detection and suspicious human activity classification using skeleton graphs." Mathematical Bio-sciences and Engineering 20.2 (2023): pp. 2669-2690 (Year: 2023).*

* cited by examiner

*Primary Examiner* — Leon Viet Q Nguyen
(74) *Attorney, Agent, or Firm* — SALIWANCHIK, LLOYD & EISENSCHENK

(57) ABSTRACT

Systems, methods, and frameworks are provided for privacy-aware weapon anomaly detection via integrated object recognition and skeletal motion analysis. This framework integrates real-time object detection and motion analysis to identify weapon anomalies in video surveillance while preserving privacy. The framework combines a fine-tuned object detection model, a head-segmentation module for anonymizing unarmed individuals, and a skeleton-based motion analysis module to detect threatening behaviors. By refining and fusing detection and motion analysis outputs, the framework enhances detection accuracy and reduces false positives, thereby providing a reliable solution for intelligent, privacy-preserving surveillance applications.

20 Claims, 11 Drawing Sheets

| Model | OD Module (A) | PA Module (B) | Filter Module (C) | Accuracy (%) | P (%) | R (%) | F1 (%) |
|---|---|---|---|---|---|---|---|
| A | ✓ | | | 75.58 | 62.96 | 97.14 | 76.4 |
| B | | ✓ | | 76.74 | 75.86 | 62.86 | 68.75 |
| A+B | ✓ | ✓ | | 86.05 | 75.56 | 97.14 | 85 |
| A+C | ✓ | | ✓ | 83.72 | 74.42 | 91.43 | 82.05 |
| B+C | | ✓ | ✓ | 79.07 | 77.42 | 68.57 | 72.73 |
| Ours | ✓ | ✓ | ✓ | 88.37 | 82.05 | 91.43 | 86.49 |

| Dataset | Weapon-Related | AUC |
|---|---|---|
| Firearm-Related Actions | Yes | 0.677 |
| HR-Avenue | No | 0.864 |
| UCF-Crime | Yes | 0.493 |

FIG. 11

| Condition | Accuracy | Precision | Recall | F1 Score |
|---|---|---|---|---|
| Unfiltered | 87.5% | 75.56% | 97.14% | 85.11% |
| Filtered | 90% | 82.05% | 91.43% | 86.32% |

FIG. 12

| Model | mAP@50-95 | mAP@50 | FPS |
|---|---|---|---|
| YOLOv8n(ConcatHead) | 0.619 | 0.867 | 88 |
| YOLOv8n(default) | 0.740 | 0.921 | 88 |
| EfficientNet | 0.560 | 0.857 | 79 |
| ResNet50_FPN_V2 | 0.712 | 0.929 | 47 |
| ResNet101 | 0.570 | 0.859 | 51 |
| ViT | 0.601 | 0.891 | 14 |

FIG. 13

| Scene | Type | Mean Anomaly Score |
|---|---|---|
| 01 | Normal | 0.0213 |
|  | Abnormal | 0.0237 (+11.3%) |
| 02 | Normal | 0.0238 |
|  | Abnormal | 0.0365 (+53.4%) |
| 03 | Normal | 0.4463 |
|  | Abnormal | 0.6919 (+55.0%) |
| 04 | Normal | 0.0270 |
|  | Abnormal | 0.0266 (-1.5%) |
| 05 | Normal | 0.2811 |
|  | Abnormal | 0.5665 (+101.5%) |

FIG. 14

SYSTEMS AND METHODS FOR PRIVACY-AWARE WEAPON ANOMALY DETECTION VIA INTEGRATED OBJECT RECOGNITION AND SKELETAL MOTION ANALYSIS

GOVERNMENT SUPPORT

This invention was made with government support under 22STESE00001 awarded by the Department of Homeland Security, Science and Technology. The government has certain rights in the invention.

BACKGROUND

Conventional video anomaly detection systems, particularly those aimed at weapon identification, frequently demonstrate limitations in effectiveness and reliability when deployed in dynamic and high-traffic public environments such as educational institutions, transportation hubs, and large-scale event venues. The mere presence of a weapon does not inherently constitute a threat, especially in environments where security personnel or authorized individuals are permitted to lawfully carry firearms. Consequently, existing systems often produce false positives, thus diminishing their reliability, situational accuracy and operational effectiveness.

To overcome the limitations, certain systems have integrated posture or motion analysis to infer behavioral intent. However, human movement is inherently variable and context-dependent, which actions such as running, falling, or abrupt directional changes may occur as part of normal behavior but are frequently misclassified as anomalies by skeleton-based models. These models generally lack the capacity to recognize surrounding objects or interpret interactions between individuals and objects within the scene. In the absence of object detection capabilities, posture analysis alone proves insufficient for reliably distinguishing between benign and potentially threatening activities. Accordingly, there remains a need for an improved anomaly detection approach that integrates motion analysis with object detection to enhance threat discrimination, reduce false positives, and improve the overall accuracy and responsiveness of real-time surveillance systems.

BRIEF SUMMARY

Embodiments of the subject invention address the challenges discussed in the Background by providing novel and advantageous systems and methods for privacy-aware weapon anomaly detection via integrated object recognition and skeletal motion analysis.

In an embodiment, a system for privacy-aware weapon anomaly detection via integrated object recognition and skeletal motion analysis can comprise: a processor; and a machine-readable medium in operable communication with the processor and having instructions stored thereon that, when executed by the processor, perform the following steps: a) detecting human figures and weapon objects in real time within each frame of an input video using an object detection model; b) classifying detected individuals as armed or unarmed by applying a proximity-based target separation technique to associate detected weapon objects with corresponding human figures, and generating a weapon confidence score indicative of the likelihood that a given individual is armed; c) anonymizing unarmed individuals by executing a head segmentation module configured to perform a facial masking operation on human figures classified as unarmed based on the absence of associated weapon objects; d) identifying abnormal motion patterns by applying a skeleton-based diffusion model to motion data extracted from detected human figures, and generating an anomaly score indicative of a deviation from normal behavioral patterns; e) applying a feature refinement module to the weapon confidence score and the anomaly score to generate a refined weapon confidence score and a refined anomaly score, the feature refinement module comprising a plurality of filtering operations; and f) applying a fusion process to the refined weapon confidence score and the refined anomaly score to generate a final anomaly score and classifying the input video as normal or abnormal by comparing the final anomaly score to a predetermined threshold. The object detection model in step a) can be generated by fine-tuning a pre-trained object detection model by adding a detection head adapted to detect weapon classes including persons, pistols, and rifles, thereby improving threat recognition performance. Step (a) can comprise: detecting one or more weapon objects within the frame of the input video; in response to (or upon) detecting at least one weapon object, proceeding to step (b) to classify detected individuals as armed or unarmed based on association with the detected weapon objects; and in response to (or upon) detecting no weapon objects, proceeding to step (c) to generate privacy-preserved frames of the input video by anonymizing detected individuals and classifying the input video as normal. Based on the classification in step b), cropped images of human figures classified as unarmed can be transmitted for anonymization (in step c)), while images of human figures classified as armed can be retained in the original, unaltered form. Step c) can comprise reinserting anonymized facial regions into corresponding spatial locations of the original frames of the input video, after the anonymization of unarmed individuals, to generate privacy-preserving video outputs for subsequent motion analysis. The identifying abnormal motion patterns in step d) can comprise employing a dynamic thresholding approach tailored to each video scene by accounting for variations in camera locations, angles, and lighting conditions, and step (d) may be performed only upon detection of a weapon to optimize computational efficiency. The plurality of filtering operations for the weapon confidence score in step e) can comprise performing an adaptive filtering mechanism in both temporal and spatial dimensions, where detections are retained only if each detection satisfies a specified minimum Intersection over Union (IoU) and persist across a specified minimum number of consecutive frames, thereby mitigating false positives. The plurality of filtering operations for the anomaly score in step e) can comprise performing a selective frame exclusion strategy by utilizing the central 80% of each frame of the input video, with the first 10% and the last 10% of frames discarded to minimize the impact of distortions on the anomaly score and to optimize the reliability and accuracy of pose estimation. The fusion process in step f) can comprise employing a multiplication operator to combine the refined weapon confidence score and the refined anomaly score in a late fusion approach for anomaly detection. The predetermined threshold in step f) can comprise an experimentally determined threshold that optimally distinguishes normal from anomalous events, thereby providing stable and accurate performance across heterogeneous environments.

In another embodiment, a method for privacy-aware weapon anomaly detection via integrated object recognition and skeletal motion analysis can comprise: a) detecting human figures and weapon objects in real time within each frame of an input video using an object detection model; b) classifying detected individuals as armed or unarmed by applying a proximity-based target separation technique to associate detected weapon objects with corresponding human figures, and generating a weapon confidence score indicative of the likelihood that a given individual is armed; c) anonymizing unarmed individuals by executing a head segmentation module configured to perform a facial masking operation on human figures classified as unarmed based on the absence of associated weapon objects; d) identifying abnormal motion patterns by applying a skeleton-based diffusion model to motion data extracted from detected human figures, and generating an anomaly score indicative of a deviation from normal behavioral patterns; e) applying a feature refinement module to the weapon confidence score and the anomaly score to generate a refined weapon confidence score and a refined anomaly score, the feature refinement module comprising a plurality of filtering operations; and f) applying a fusion process to the refined weapon confidence score and the refined anomaly score to generate a final anomaly score and classifying the input video as normal or abnormal by comparing the final anomaly score to a predetermined threshold. The method can further comprise generating the object detection model by fine-tuning a pre-trained object detection model by adding a detection head adapted to detect weapon classes including persons, pistols, and rifles, thereby improving threat recognition performance. Step (a) can comprise: detecting one or more weapon objects within the frame of the input video; in response to (or upon) detecting at least one weapon object, proceeding to step (b) to classify detected individuals as armed or unarmed based on association with the detected weapon objects; and in response to (or upon) detecting no weapon objects, proceeding to step (c) to generate privacy-preserved frames of the input video by anonymizing detected individuals and classifying the input video as normal. Based on the classification in step b), cropped images of human figures classified as unarmed can be transmitted for anonymization (in step c)), while images of human figures classified as armed can be retained in the original, unaltered form. Step c) can comprise reinserting anonymized facial regions into corresponding spatial locations of the original frames of the input video, after the anonymization of unarmed individuals, to generate privacy-preserving video outputs for subsequent motion analysis. The identifying abnormal motion patterns in step d) can comprise employing a dynamic thresholding approach tailored to each video scene by accounting for variations in camera locations, angles, and lighting conditions, and step (d) may be performed only upon detection of a weapon to optimize computational efficiency. The plurality of filtering operations for the weapon confidence score in step e) can comprise performing an adaptive filtering mechanism in both temporal and spatial dimensions, where detections are retained only if each detection satisfies a specified minimum IoU and persist across a specified minimum number of consecutive frames, thereby mitigating false positives. The plurality of filtering operations for the anomaly score in step e) can comprise performing a selective frame exclusion strategy by utilizing the central 80% of each frame of the input video, with the first 10% and the last 10% of frames discarded to minimize the impact of distortions on the anomaly score and to optimize the reliability and accuracy of pose estimation. The fusion process in step f) can comprise employing a multiplication operator to combine the refined weapon confidence score and the refined anomaly score in a late fusion approach for anomaly detection. The predetermined threshold in step f) can comprise an experimentally determined threshold that optimally distinguishes normal from anomalous events, thereby providing stable and accurate performance across heterogeneous environments. Any or all steps or sub-steps can be performed by a processor.

BRIEF DESCRIPTION OF DRAWINGS

FIG. 4(a) shows a confusion matrix representing the results of the skeletal motion analysis only, indicating the classification performance in terms of true positives, true negatives, false positives, and false negatives and showing that skeletal motion analysis alone detects 44 normal and 22 abnormal events, with seven false positives and thirteen false negatives. FIG. 4(b) shows a confusion matrix generated after applying unfiltered weapon confidence score and showing that incorporating the unfiltered weapon confidence score improves detection to 40 normal and 34 abnormal events, reducing false negatives to one while resulting in eleven false positives. FIG. 4(c) shows a confusion matrix generated after applying filtered weapon confidence score and showing that incorporating the filtered weapon confidence score further refines accuracy, correctly identifying 44 normal and 32 abnormal events, and reducing false negatives to three and false positives to seven.

FIG. 6(a) shows reconstruction loss over training steps, with a solid line representing the rolling mean and dashed lines indicating one standard deviation above and below (window size=30). The shaded region between the dashed lines reflects variability, initially wide but narrowing as training progresses. The loss exhibits a general downward trend and stabilizes around 600 steps, indicating improved and consistent reconstruction accuracy for typical poses. FIG. 6(b) shows noise loss over training steps, with a solid line representing the rolling mean and dashed lines indicating one standard deviation above and below (window size=30). The shaded area reflects variability, initially wide but narrowing over time. The rolling mean progressively decreases and stabilizes at approximately 700 steps, indicating reduced noise loss and improved noise handling during pose prediction.

FIG. 7(a) shows the anomaly score distribution corresponding to the normal video clip for Scene_01. FIG. 7(b) shows the anomaly score distribution corresponding to the normal video clip for Scene_02. FIG. 7(c) shows the anomaly score distribution corresponding to the normal video clip for Scene_03. FIG. 7(d) shows the anomaly score distribution corresponding to the abnormal video clip for Scene_01. FIG. 7(e) shows the anomaly score distribution corresponding to the abnormal video clip for Scene_02. FIG. 7(f) shows the anomaly score distribution corresponding to the abnormal video clip for Scene_03.

FIG. 7(a) shows anomaly scores across video frames for ten different videos, labeled 01-01 through 01-10. The graph shows frame numbers on the x-axis, while the y-axis represents anomaly scores. Each video is represented by a distinct line that traces its anomaly score progression throughout the frame sequence. The lines exhibit considerable variation and fluctuation, with most videos showing relatively stable anomaly scores in the lower range, approximately between 0.015 and 0.025 for the majority of frames, though several videos demonstrate notable spikes and increases toward the latter portion of the sequence. The line labeled 01-10 exhibits a pronounced elevation in anomaly scores for select videos between frames 160 and 180, compared with other lines having peaks reaching approximately 0.030 to 0.035. The overall pattern suggests that anomaly detection varies significantly both between different videos and across different temporal segments within individual videos, with the most dramatic anomalous activity concentrated in the final portions of the analyzed sequences.

FIG. 7(b) shows anomaly scores across frames for nine different videos, labeled 02-01, 02-02, 02-03, 02-04, 02-05, 02-14, 02-15, 02-17, and 02-21. Many of the plotted lines exhibit a fluctuating pattern, generally starting at higher anomaly scores, subsequently decreasing to a local minimum within the mid-range frame indices, approximately between frames 80 and 120, and then often increasing again towards higher frame numbers. Notably, the line labeled 02-04 exhibits significant spikes in anomaly scores, including a peak near frame 115, which represents the highest point in the plot. Additionally, the line labeled 02-15 reaches a high point around frame 105. The overall trend suggests varying degrees of anomalous behavior over time for the different video sequences.

FIG. 7(c) shows anomaly scores across frames for ten different videos, labeled 03-04, 03-06, 03-12, 03-09, 03-15, 03-16, 03-19, 03-21, 03-26, and 03-31. The lines generally show localized peaks, indicating periods of increased anomaly scores. Many lines start with low or zero anomaly scores, then rise sharply to a peak, and subsequently decrease back to low or zero scores. These peaks occur at various frame numbers, with some lines exhibiting multiple peaks. For example, the line labeled 03-04 exhibits a prominent peak with an anomaly score approaching 10 near frames 145 to 150. The line labeled 03-31 shows a significant peak around frames 95 to 100, while the line labeled 03-15 peaks around frames 180 to 185. The overall impression is one of sporadic and distinct anomalous events occurring at different times within the various video sequences.

FIG. 7(d) shows anomaly scores across frames for six different videos, labeled 01-01 through 01-06. Most lines exhibit a fluctuating, undulating pattern, with anomaly scores generally oscillating within the given range as the frame number increases. There are several peaks and troughs visible for various lines at different frame numbers. For instance, the line labeled 01-02 exhibits a prominent peak around frames 85 to 90, reaching the highest anomaly score in the plot, followed by a secondary increase starting near frame 140. Other lines display local maxima and minima throughout their respective durations. Overall, the figure illustrates the dynamic changes in anomaly scores over time for multiple video sequences.

FIG. 7(e) shows anomaly scores across frames for six different videos, labeled 02-01, 02-02, 02-05, 02-08, 02-09, and 02-03. Most lines show relatively low and stable anomaly scores, generally fluctuating between 0.02 and 0.04 across the frames. However, the line labeled 02-09 exhibits a sharp increase in anomaly score, rising from a low value to reach the highest point in the plot, approximately 0.30, near frames 145 to 150. Following the sharp spike, the anomaly score for the line labeled 02-09 decreases steeply. The remaining lines exhibit relatively stable patterns with minor fluctuations throughout the frame range. The figure highlights a single, significant anomalous event in one video. In contrast, the remaining videos exhibit consistently low anomaly scores throughout the observed frame range.

FIG. 7(f) shows anomaly scores across frames for ten different videos, labeled 03-02, 03-03, 03-11, 03-12, 03-13, 03-15, 03-17, 03-18, 03-20, and 03-22. The lines generally show pronounced, localized peaks, indicating periods of heightened anomaly scores. Many lines start with low or zero anomaly scores, then rise sharply to a peak, and subsequently decrease back to low or zero scores. These peaks occur at various frame numbers, with some lines exhibiting single, very high peaks, while others show broader or multiple peaks of lower magnitude. For example, the line labeled 03-11 reaches the highest point in the plot, exceeding an anomaly score of 20 near frames 155 to 160. Lines 03-17 and 03-18 exhibit significant peaks near frames 165 to 170 and 190 to 195, respectively. The figure illustrates distinct, strong anomalous events occurring at different times across the video sequences.

FIG. 11 shows a table of comparison of the skeleton-based diffusion model performance for anomaly detection across different datasets.

FIG. 12 shows a table of comparison of performance metrics between unfiltered and filtered weapon detection confidence scores, evaluated by accuracy, precision, recall and F1 score.

FIG. 13 shows a table of comparison of weapon detection performance of You Only Look Once (YOLO), the real-time object detection model, with other models, evaluated by mAP@50-95, mAP@50 and frames per second (FPS).

FIG. 14 shows a table of mean anomaly scores across different scenes, with percentages in parentheses indicating the relative increase or decrease of anomaly scores for abnormal scenes in comparison to normal scenes.

DETAILED DESCRIPTION

Figure 1:
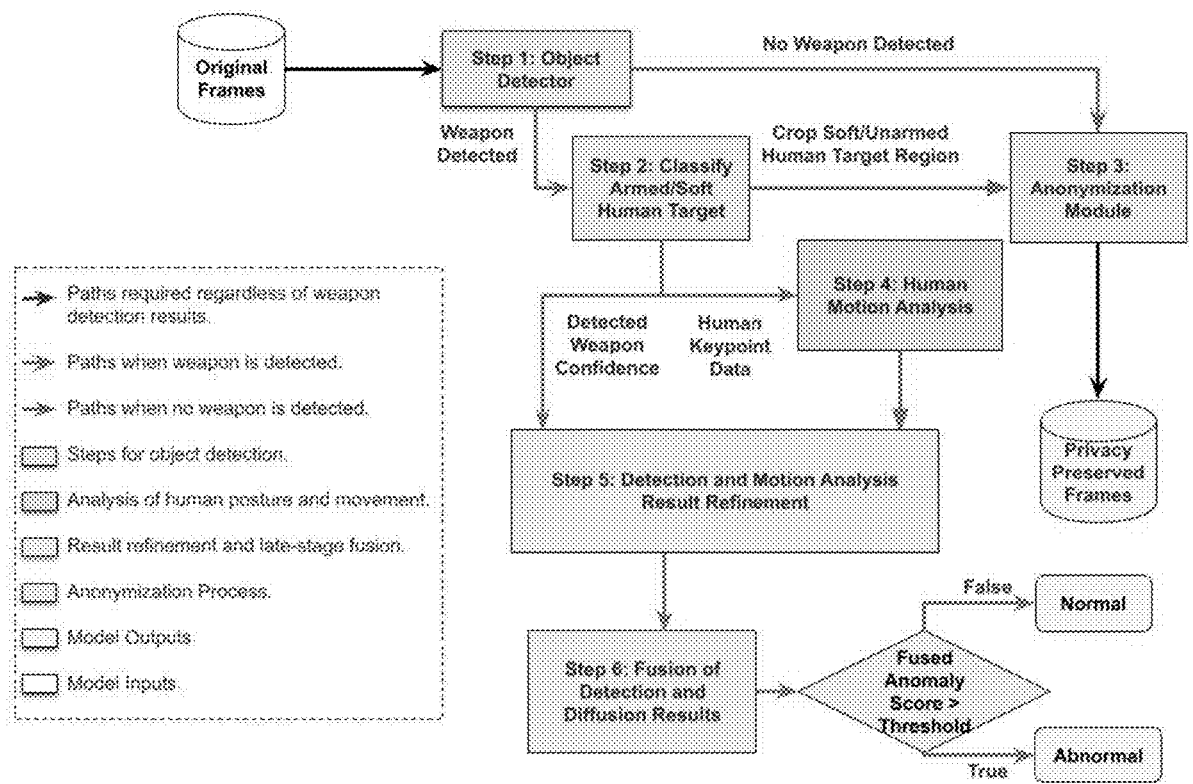
FIG. 1 shows an architecture of a system for privacy-preserving anomaly detection that integrates object detection and skeletal motion analysis to enable context-aware threat identification. The system receives an input video and generates privacy-preserving frames, weapon location data, and classifications of the input video as normal or abnormal, according to an embodiment of the subject invention.

Embodiments of the subject invention provide novel and advantageous systems and methods for privacy-aware weapon anomaly detection via integrated object recognition and skeletal motion analysis. Weapon anomalies can be defined as circumstances in which an individual not only possesses a weapon but also manifests an intention to employ the weapon, exemplified by actions such as aiming at another person or assuming a posture indicative of readiness to discharge the weapon.

Anomaly detection in video surveillance is essential for ensuring public security. However, conventional systems that exclusively rely on weapon presence frequently produce false alarms, particularly in environments where personnel routinely carry firearms. Posture analysis when considered independently is inadequate due to the inherent variability of human motion and the absence of contextual awareness. Actions like running or falling, while often normal, are frequently misclassified as anomalies by skeleton-based systems, consequently highlighting the imperative to incorporate situational context for precise anomaly identification.

To address limitations of conventional surveillance systems, embodiments of the subject invention provide a novel framework that integrates a real-time object detection model fine-tuned for detecting humans and weapons, a head segmentation module operative to anonymize individuals not exhibiting possession of a weapon, and a motion analysis module configured to detect anomalous behaviors indicative of potentially dangerous activity. By employing a late fusion technique for anomaly decision-making, the framework achieves improved accuracy and efficiency in anomaly detection, while simultaneously enhancing compliance with privacy requirements through selective data utilization and modality integration. Operational efficiency is further enhanced by activating motion analysis exclusively in response to a positive weapon detection event, thereby conserving computational resources and reducing unnecessary processing during periods of non-threatening activity.

Embodiments of the subject invention provide at least the following advantageous features: (1) improved accuracy and reliability; (2) reduced false positives; (3) context-aware anomaly detection; (4) privacy preservation; and (5) optimized computational efficiency. With regard to improved accuracy and reliability, the framework refines outputs from both weapon detection and motion analysis to ensure temporal and spatial consistency of detected weapons. Furthermore, anomaly scores produced by the motion analysis module are adjusted to yield more stable and reliable results, accordingly, improving overall detection performance. With regard to reduced false positives, systems relying solely on weapon detection may erroneously classify benign objects, such as cameras, as weapons, while posture analysis alone remains inadequate due to the variability and context-dependent nature of human motion. By integrating and refining both detection modalities, the framework enables more robust and reliable anomaly detection. With regard to context-aware anomaly detection, the framework identifies weapon anomalies by evaluating both the presence of weapons and associated threatening behaviors, such as aiming at an individual or assuming a posture indicative of readiness to discharge the weapon, hence enabling a comprehensive assessment of potential threats. With regard to privacy preservation, the head segmentation module is configured to anonymize individuals not exhibiting possession of a weapon by obscuring identifiable facial features, therefore ensuring compliance with privacy regulations while maintaining essential motion data for subsequent analysis. Identifiable information is employed solely during the initial detection and classification of armed and unarmed individuals and is neither retained nor utilized in any subsequent stage of the framework. With regard to optimized computational efficiency, the framework selectively activates motion analysis in response to weapon detection, thus minimizing unnecessary computational load and enhancing real-time processing performance.

FIG. 1 shows an architecture of a privacy-preserving anomaly detection system that integrates object detection and skeletal motion analysis for video surveillance while ensuring compliance with privacy requirements. The system comprises an object detection module for real-time detection of humans and weapons, a classification module configured to distinguish between armed and unarmed individuals, an identity masking module to anonymize unarmed individuals, a skeleton-based diffusion model for anomaly detection, and a final anomaly score fusion module configured to classify events based on combined detection and behavioral analysis results. FIG. 1 also serves as a flowchart of the system depicting the sequential steps including weapon and person detection via the object detection module, anomaly detection through the skeleton-based diffusion model, classification of armed and unarmed targets, privacy-preserving frame generation, and the final anomaly decision-making process integrating detection and motion analysis outputs. The process initiates at Step 1, during which a real-time object detection model, fine-tuned for detecting humans and weapons, processes video frames to identify relevant targets. If no weapon is detected, the system proceeds to Step 3, in which privacy-preserved frames are generated and the video is classified as normal. Upon detection of a weapon, the system proceeds to Step 2, in which detected individuals are classified as armed or unarmed through the application of a proximity-based target separation technique that associates detected weapon objects with corresponding human figures, and subsequently generates a weapon confidence score indicative of the likelihood that a given individual is armed. In Step 3, a head segmentation module anonymizes unarmed individuals by masking facial features, ensuring compliance with privacy requirements while retaining body data necessary for motion analysis. The privacy-preserved frames are subsequently compiled to generate a privacy-preserved video, which is output in conjunction with a classification indicating whether the video is normal or abnormal. Simultaneously, in Step 4, abnormal motion patterns are identified by applying a skeleton-based diffusion model to motion data extracted from detected human figures, with reconstruction loss used to generate an anomaly score indicative of deviation from normal behavioral patterns. In Step 5, a feature refinement module applies a plurality of filtering operations to the weapon confidence score and the anomaly score, filtering results from the object detection module to compute an average weapon confidence score and filtering results from the skeleton-based diffusion model to compute an average anomaly score. In Step 6, a fusion process is applied to the refined weapon confidence score and the refined anomaly score to generate a final anomaly score, with the refined weapon confidence score multiplied by the refined anomaly score to reflect the interdependence, so that elevated scores in both metrics are required to indicate a critical threat level. The final anomaly score is then compared to a predetermined threshold to classify the event as normal or anomalous.

You Only Look Once (YOLO) refers to a real-time object detection model that employs a convolutional neural network (CNN) to extract image features and predict object locations and classes in a single forward pass. The YOLO model is employed for object detection due to the superior performance in real-time applications. The YOLO model balances detection speed and accuracy, rendering it suitable for processing video streams requiring timely identification. The pre-trained YOLO model is fine-tuned to detect persons, pistols, and rifles to enable accurate recognition of potential threats within video footage. Prior studies have demonstrated the effectiveness of the YOLO model across various object detection tasks, supporting the selection of the model.

The procedure for the object detection stage comprises dataset preparation, fine-tuning of the pre-trained YOLO model, and execution of object detection. In Step 1, the pre-trained YOLO model is modified by incorporating an additional detection head configured to detect the newly introduced weapon classes. Detection head refers to a component of an object detection module configured to generate output predictions, including object class probabilities and corresponding bounding box coordinates, based on extracted feature representations. This modification enables weapon detection without compromising performance on the original Common Objects in Context (COCO) classes. COCO classes refer to the predefined set of 80 object categories in the COCO dataset, widely used for training and evaluating object detection models. To optimize training efficiency and reduce dataset requirements, only the additional detection head is trained, while the initial 22 layers are frozen to preserve the pre-trained weights. This approach, which involves adding an additional detection head for weapon classes and freezing the initial layers during fine-tuning, preserves the model's capability to detect the original 80 COCO classes while focusing training on the new weapon classes.

A key architectural modification comprises the addition of a prediction output concatenation layer within the CNN of the YOLO architecture, the layer being configured to merge outputs from the original COCO detection head and the newly trained weapon detection head. Each detection head independently generates 6,300 bounding box proposals. Bounding box proposals refer to candidate regions within an image generated by an object detection module, which are hypothesized to contain objects prior to classification and confidence scoring. The prediction output concatenation layer concatenates the bounding box proposals generated by the original COCO detection head and the weapon detection head along the bounding box dimension, accordingly, producing a unified output that integrates both COCO and weapon classes without conflicting predictions. The COCO head outputs classification scores for 80 classes, while the weapon head outputs scores for 2 classes. Zero-padding is applied to each head's classification outputs to ensure dimensional alignment with the unified bounding box set. "Heads" denote distinct subnetworks within the object detection model, each responsible for predicting a defined subset of object classes.

The resulting output tensor has a shape [N, 86, 12,600], where N denotes the batch size, 86 comprises 4 bounding box coordinates and 82 class probabilities corresponding to 80 COCO classes and 2 weapon classes, and 12,600 represents the total number of bounding box proposals by concatenating outputs from both detection heads. This architecture facilitates seamless integration of additional weapon classes while preserving detection accuracy on existing COCO classes. During fine-tuning, early convolutional layers are frozen to retain foundational feature representations, consequently minimizing training data requirements and reducing training time. The prediction output concatenation and shared feature extraction ensure consistent performance across all target object categories.

The objective of classification of armed and unarmed targets step is to categorize detected individuals in surveillance imagery as either armed or unarmed (soft) human targets. This classification establishes a crucial distinction necessary for enabling privacy protection mechanisms and targeted anomaly detection. Individuals classified as armed are identified as a higher-risk subjects and are subjected to differentiated processing protocols in subsequent operational steps. Accurate separation of armed and unarmed individuals permits the application of privacy-preserving measures specifically to non-threatening subjects, thus minimizing unnecessary exposure of personal identity. Concurrently, detection and analysis resources are concentrated on individuals posing a potential threat. The modular configuration of the framework facilitates adaptable management of armed human targets in accordance with variable application-specific requirements and operational constraints.

In the step of classification of armed and unarmed targets, the classification process is initiated by computing the center points of detected weapons and person bounding boxes. A minimum-distance pairing algorithm is subsequently employed to associate each detected weapon with the nearest detected person. The center point of a bounding box, whether corresponding to a person or a weapon, is determined as the midpoint of the diagonal defined by the box's corner coordinates. Specifically, for a bounding box defined by the top-left coordinate ($x_{min}$, $y_{min}$) and the bottom-right coordinate ($x_{max}$, $y_{max}$), the center point ($x_c$, $y_c$) is calculated in accordance with the following expressions:

$$x_c = \frac{x_{min} + x_{max}}{2}, y_c = \frac{y_{min} + y_{max}}{2}$$

Next, the Euclidean distance between the center point of each detected weapon and the center point of each detected person is computed according to the following formula:

$$\text{Distance}(w,p) = \sqrt{(x_w - x_p)^2 + (y_w - y_p)^2}$$

where ($x_w$, $y_w$) and ($x_p$, $y_p$) denote the center points of the weapon and the person, respectively. Each weapon is associated with the person corresponding to the minimum computed Euclidean distance.

Once a weapon is paired with the nearest person, the individual is classified as an armed human target. Individuals not paired with any weapon are classified as unarmed (soft) human targets. Concurrently, the YOLO model is employed to extract and track the poses of each detected individual within the video sequence, generating a temporal series of postures for each person. The resulting pose data is transmitted to the skeleton-based diffusion model, serving as critical input for anomaly detection and pose anomaly analysis.

The objective of forming privacy-preserving frames step is to provide privacy protection for unarmed individuals (soft human targets) identified during the classification of armed and unarmed targets step. In surveillance and anomaly detection systems, it is critical to balance security requirements with individual privacy considerations. Head-masking techniques are employed to obscure identifiable features, including facial regions, thereby ensuring compliance with applicable data protection regulations. Such regulations include the General Data Protection Regulation (GDPR) of the European Union and the California Consumer Privacy Act (CCPA) of the United States. These regulations require the anonymization of personally identifiable information (PII) when individuals are monitored without explicit consent.

In the forming privacy-preserving frames step, the head segmentation module anonymizes unarmed individuals by masking head regions in video frames to obscure facial features and protect identities. The head segmentation module employes advanced segmentation techniques to accurately delineate head regions, subsequently processing and reinserting masked regions to maintain visual context for uninterrupted analysis. This privacy-preserving layer enables surveillance footage to retain essential motion information necessary for tracking and anomaly detection while ensuring compliance with privacy regulations. The disclosed approach is particularly suited for deployment in public or corporate environments where privacy protection and regulatory compliance are imperative, therefore balancing security requirements with ethical considerations.

While detection of the presence of a weapon is a crucial component, detection alone is insufficient for achieving comprehensive anomaly detection. The contextual actions surrounding the weapon, such as motion indicative of a potential shooting event or the flight response of nearby individuals, are essential for accurately identifying abnormal behavioral patterns. To capture and analyze the critical actions, the disclosed system focuses on human skeletal motion, enabling the extraction of dynamic posture sequences relevant to behavioral assessment. The use of skeleton-based data facilitates privacy preservation by abstracting identifiable features and concentrating exclusively on movement trajectories. This permits robust anomaly detection while maintaining compliance with privacy requirements. The anomaly detection model employs a diffusion-based architecture, adapted from prior foundational work, to predict and detect irregularities in human motion. The model reconstructs future skeletal motion frames, which are purposefully perturbed with noise, using a sequence of uncorrupted past motion frames as reference. Anomalous events are identified by measuring significant discrepancies between the reconstructed future motion and the observed actual motion (because the diffusion model was only trained on normal motions), which indicate the presence of abnormal activity.

The diffusion model operates by initially corrupting future pose data, represented as joint coordinates, through the application of random displacement noise. The uncorrupted past motion frames are utilized as a conditioning signal to guide the model in generating plausible future motion sequences. This mechanism enables the model to learn standard movement trajectories and identify deviations indicative of abnormal actions. The model employs a U-Net-like architecture to denoise the corrupted future frames and generate multiple candidate future motion sequences, thus accounting for the inherent variability in human motion, enhancing robustness in anomaly detection. Anomalous events are detected by computing a reconstruction error between the predicted future motion and the actual observed motion. Reconstruction error quantifies the discrepancy between joint coordinates using a predefined distance metric. A higher reconstruction error indicates greater deviation from expected motion and signals anomalous activity. Rather than applying a fixed threshold, the system utilizes a dynamic thresholding approach that is adapted to each video scene. Given the variability in camera locations, angles, and lighting conditions, anomaly scores may differ in both range and scale across different scenes. By adjusting the threshold dynamically for each scene, the system achieves improved accuracy in the classification of normal versus anomalous behavior, thereby compensating for inconsistencies arising from environmental differences. This threshold-based methodology enables efficient identification of substantial deviations from expected motion trajectories, allowing for reliable detection of abnormal motion patterns under diverse operational conditions.

Two key modifications are implemented to improve the pose extraction and anomaly score evaluation. First, the original pose extraction and tracking method is replaced with the YOLO Pose Model, which integrates pose extraction and tracking into a single step, thereby reducing computational overhead while maintaining accuracy. Second, the anomaly score is evaluated by averaging frame-level anomaly scores over each video clip. Averaging the anomaly score over time mitigates fluctuations caused by brief, inconsequential movements or transient posture changes, hence preventing the system from being overly sensitive to momentary, non-threatening anomalies. By emphasizing overall trends in movement patterns throughout the clip, this approach improves detection precision in complex scenarios with significant frame-to-frame variation. Additionally, this approach enables more robust differentiation between normal and abnormal motion, providing a stable basis for determining the optimal threshold for anomaly detection.

To generate meaningful results from the reconstruction loss produced by the skeleton-based diffusion model and to refine the YOLO detection outputs, two key scores are computed: a weapon confidence score c, obtained from the object detection model, and an anomaly score s, derived from the skeleton-based diffusion model. Reconstruction loss is a training objective that quantifies the discrepancy between predicted and ground truth data. The anomaly score s is calculated based on the reconstruction loss and serves as an indicator for identifying anomalous motion patterns.

To mitigate false positives in weapon detection, such as a phone misclassified as a weapon, a filtering system is applied across temporal and spatial dimensions. True weapon detections persist over multiple consecutive frames, while false positives are typically sporadic or transient. Accordingly, only weapon detections sustained for a minimum of n=5 consecutive frames are considered valid. The threshold n=5 balances false positive reduction with detection sensitivity. Lower thresholds (e.g., n=2) risk accepting transient false positives, whereas higher thresholds may omit brief but genuine detections in fast-moving scenarios. Additionally, to ensure consistent tracking of the same weapon across frames, Intersection over Union (IoU) of bounding boxes is employed. A minimum IoU threshold of 0.3 between consecutive detections enforces spatial consistency, confirming that the detections correspond to the same object. This spatial filtering prevents misidentification of distinct objects in close proximity as a single weapon. Confidence scores from persistent tracks are averaged to compute the final weapon confidence score c.

For the skeleton-based diffusion model results, the anomaly score s is computed by averaging the reconstruction loss across frames within each video clip. To improve the stability and accuracy of this score, posture keypoint data from the first and last 10% of frames is excluded from the calculation. Keypoint data refers to coordinate values representing anatomical landmarks on the human body, such as joints, extracted by a pose estimation model. Keypoint data typically includes spatial positions and, optionally, confidence scores, enabling analysis of posture and motion. These segments are more susceptible to distortion resulting from factors such as unfavorable camera angles or partial occlusion, which may cause subjects to appear partially outside the frame or from skewed perspectives. Additionally, individuals may be entering or exiting the camera's field of view during these intervals, leading to incomplete or unreliable posture data. By excluding these frames, the impact of the distortions on the anomaly score is minimized. Focusing on the central 80% of the video ensures more consistent and reliable pose extraction, therefore producing a more accurate anomaly score and reducing the likelihood of false positives caused by transient occlusions or edge-of-frame artifacts.

The disclosed framework determines whether a video clip represents normal or anomalous activity by incorporating both detection results and posture analysis derived from the skeleton-based diffusion model. A multimodal approach employing late fusion is utilized to combine the weapon confidence score c and the anomaly score s generated by the skeleton-based diffusion model. The final anomaly score r is computed using the following formula:

$$r = c \times s$$

Multiplication is selected as the fusion method to ensure that both components, weapon detection confidence and abnormal human motion, must be concurrently present to yield a high final anomaly score. If either the weapon confidence score c or the anomaly score s is low, the final anomaly score r remains low, thus reducing the likelihood of false positives. This formulation enables the model to assess whether the video clip contains a detected weapon and whether the associated human motion is consistent with a potential threat, such as aiming, preparing to discharge a weapon, or, conversely, engaging in normal behavior such as walking. By requiring concurrence between object presence and abnormal behavior, the model filters out scenarios in which a weapon-like object is detected but the corresponding motion is non-threatening. This integrated analysis of object detection and motion analysis enhances the precision and reliability of the anomaly detection process.

The false positive filter assigns a weapon confidence score c of zero to misclassified objects, resulting in a final anomaly score of r=0 and permitting the video clip to be disregarded as weapon-free. If a false detection passes the filter, normal human motion produces a low anomaly score s, further reducing the final anomaly score r. For legitimate weapon detections, such as law enforcement personnel carrying firearms, the weapon confidence score c remains high, while the anomaly score s remains low due to non-threatening behavior, resulting in a low final anomaly score r. In instances of true weapon-related anomalies, both c and s are elevated, yielding a high final anomaly score r that indicates a potential threat. This final anomaly score r is compared against an experimentally determined threshold configured to optimally differentiate normal from anomalous events. The threshold is adjusted per scene to accommodate variations in lighting, camera angles, and scene complexity, thereby maintaining consistent detection accuracy across diverse environments.

Embodiments of the subject invention provide a focused technical solution for detecting weapon-related anomalies by integrating a fine-tuned object detection model for humans and weapons, a skeleton-based diffusion model for identifying dangerous anomalies, and a late fusion approach for anomaly evaluation. To preserve privacy, unarmed individuals are anonymized through a head segmentation module. This integration addresses existing limitations by enhancing accuracy and reducing false positives, thereby significantly improving public safety through timely and reliable threat identification in surveillance environments without compromising individual privacy.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

In the experimental evaluation, the performance of the disclosed framework was assessed through three principal stages. In the first stage, the pre-trained YOLO model was fine-tuned for weapon detection to enable accurate identification of firearms within video footage. In the second stage, the skeleton-based diffusion model was trained to detect behavioral anomalies by analyzing human motion patterns. In the third stage, a late fusion approach was applied to integrate the detection results from the YOLO model with the anomaly scores generated by the diffusion model, therefore computing the overall abnormality of each video clip. These stages were structured to validate the effectiveness of the framework in detecting weapon-related anomalies while preserving individual privacy. The design ensured efficient detection of potential threats without compromising identity protection, rendering the approach suitable for surveillance contexts requiring anonymous monitoring of human motion.

Figures 2, 3:
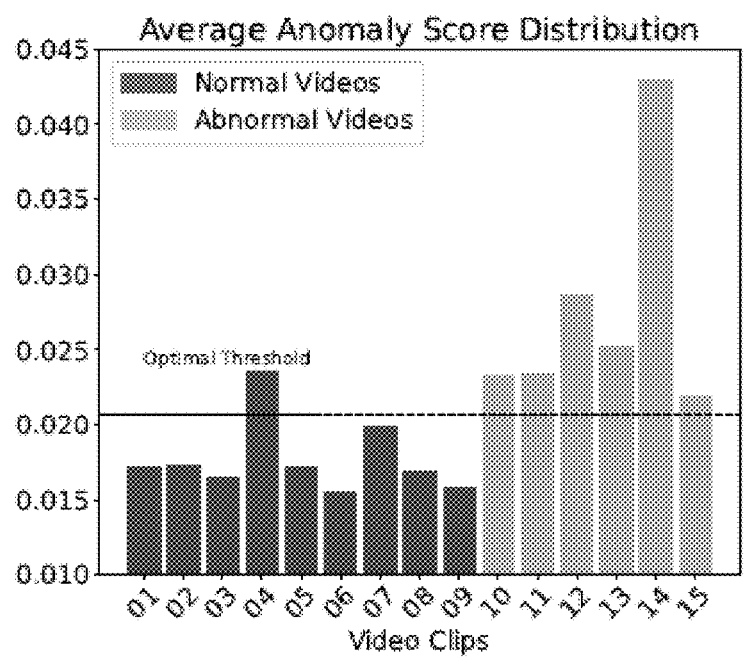
FIG. 2 shows an evaluation of the contribution of each module in the system based on ablation experiments performed on the object detection (OD) module (A), the pose analysis (PA) module employing skeletal motion analysis (B), and the result filter module (C), with performance assessed in terms of accuracy, precision, recall, and F1 score.
FIG. 3 shows average anomaly score distribution for Scene_02, highlighting the optimal threshold applied to distinguish anomalous events.

An ablation study was conducted to evaluate the contribution of each module in the framework. Experiments were performed on the object detection (OD) module based on the YOLO model (A), the pose analysis (PA) module employing the skeleton-based diffusion model (B), and the result filter module (C), as shown in FIG. 2. Using only the OD module (A), the framework classified all videos containing detected weapons as anomalies, without considering posture information. In contrast, the PA module (B) identified abnormal postures as anomalies irrespective of weapon presence. The filter module (C) improved classification accuracy by incorporating contextual information, thereby reducing false positives.

Example 1

Figure 5:
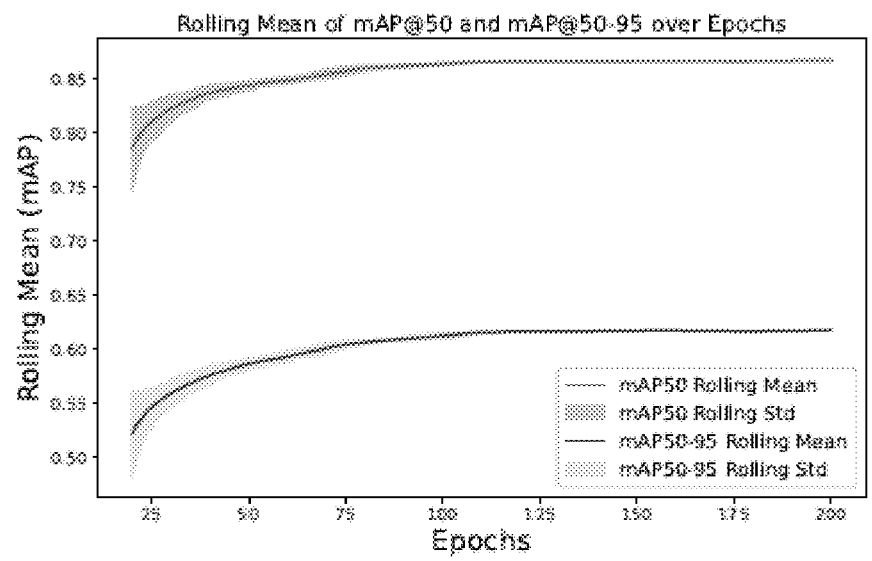
FIG. 5 shows the trends of mAP@50 and mAP@50-95 across training epochs, illustrating the model's performance progression. mAP@50, the mean Average Precision (mAP) at an Intersection over Union (IoU) threshold of 50 percent (%), reaches 0.867, while mAP@50-95, the average mAP computed across IoU thresholds from 50% to 95% in 5% increments, reaches 0.618. The line graph displays the rolling mean of both metrics, with mAP@50 consistently exceeding mAP@50-95. Both curves rise steadily, with shaded areas indicating the rolling standard deviations, which are wider early in training and narrow over time.

In this experiment, the pre-trained YOLO model was fine-tuned for weapon detection using the Weapon Detection Dataset and the Action Recognition and Object Detection Dataset for Firearm-Related Actions. The model was trained for 200 epochs with a batch size of 64 and a learning rate of 0.001. To retain the pre-trained weights obtained from the COCO dataset, the initial 22 convolutional layers were frozen, hence restricting gradient updates and concentrating training on the layers responsible for learning the newly introduced weapon detection classes. Data augmentation techniques were applied to increase the model's generalization capability and robustness across varied input conditions. mAP@50, the mean Average Precision (mAP) at an IoU threshold of 50 percent (%), reaches 0.867, while mAP@50-95, the average mAP computed across IoU thresholds from 50% to 95% in 5% increments, reaches 0.618, indicating effective performance in firearm detection tasks presented in FIG. 5.

To extend the model's capabilities, the fine-tuned detection head was merged with the original COCO detection head. The first 22 layers of the network remained frozen to retain the feature representations learned from the COCO dataset, thus enabling the model to detect both pre-existing object classes from the COCO dataset and newly added weapon classes specific to the fine-tuned detection task. Furthermore, the performance of the YOLO model was compared with that of other state-of-the-art object detection architectures to evaluate the relative effectiveness in multi-class detection scenarios.

Example 2

Anomaly situations were defined as instances in which an individual held a weapon while either half-squatting in a ready-to-shoot posture or aiming a firearm. Video clips depicting natural motions, including walking while holding a weapon or the absence of any weapons, were categorized as normal. Natural poses representing common non-threatening actions were selected for training regardless of weapon presence. Pose sequences for each individual in the videos were extracted using the YOLO Pose tracking method. The skeleton-based diffusion model was trained exclusively on these normal poses to establish a baseline of typical human behavior. This baseline enabled the model to detect deviations during inference, indicative of anomalous or potentially aggressive actions.

Figure 6A:
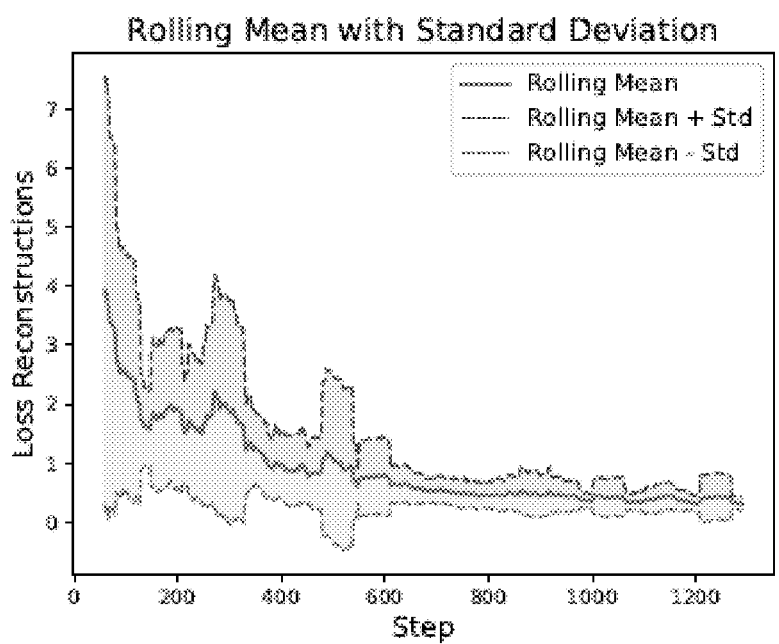
FIGS. 6(a)-6(b) show the training progression of a skeleton-based diffusion model with reconstruction loss and noise loss plotted against training steps. Each curve represents a rolling mean computed over a window size of 30 iterations. Shaded regions surrounding each curve denote the standard deviation, indicating variability in the respective loss functions. The convergence behavior observable in these plots is indicative of model stability and learning efficiency, which are critical for accurate anomaly detection performance.
Figure 6B:
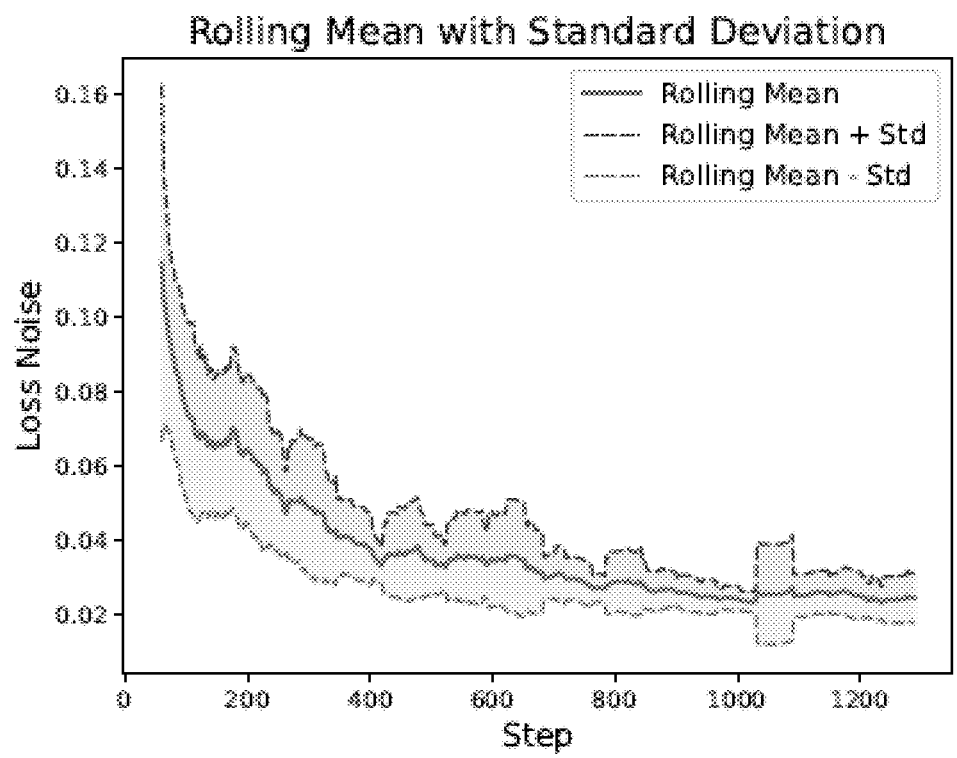
Figure 7A:
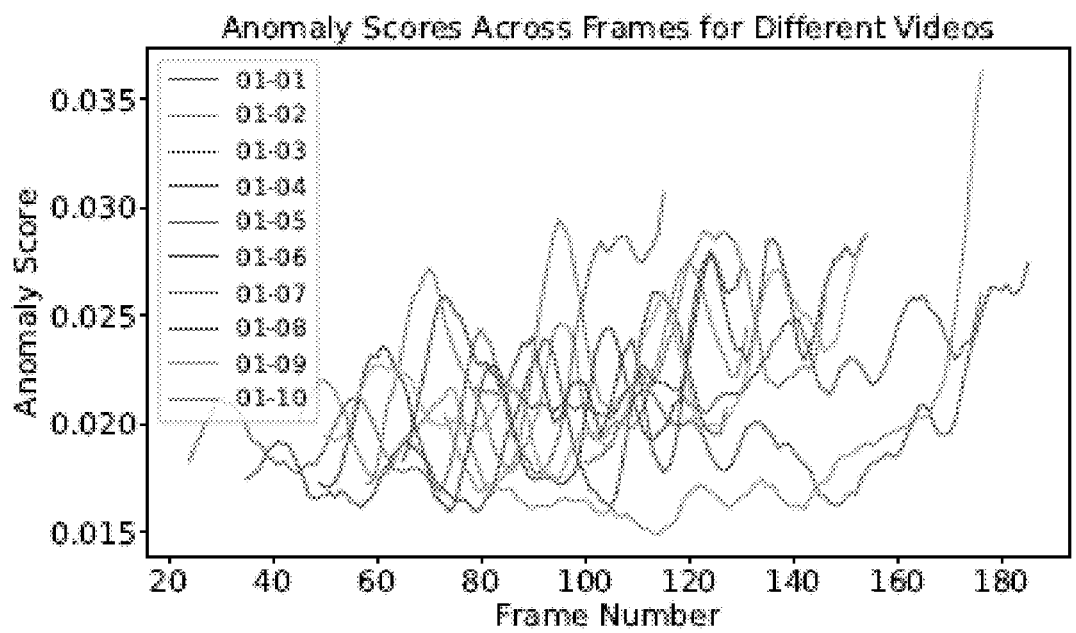
FIGS. 7(a)-7(f) show anomaly score distributions for both normal and abnormal video clips across three distinct scenes.
Figure 7B:
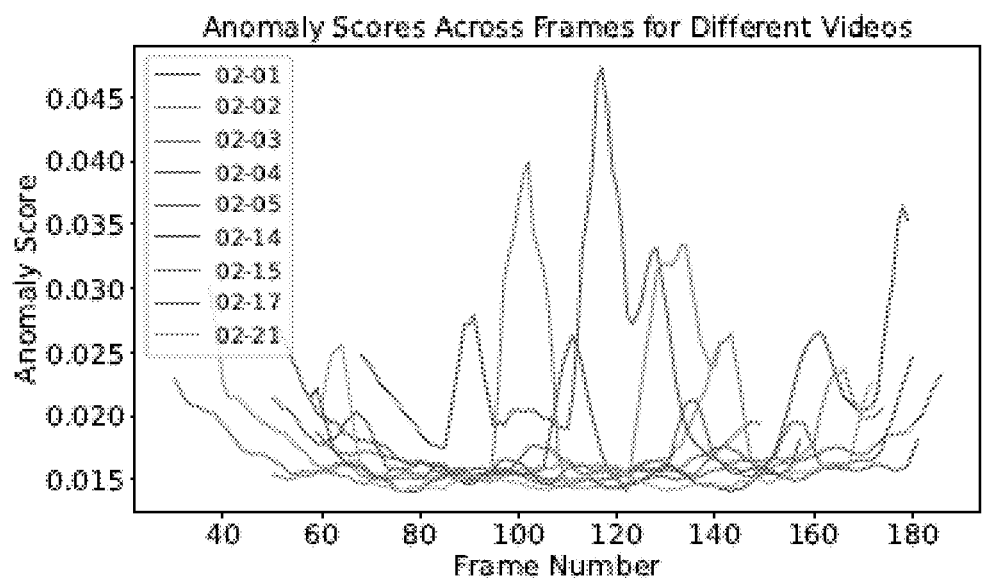
Figure 7C:
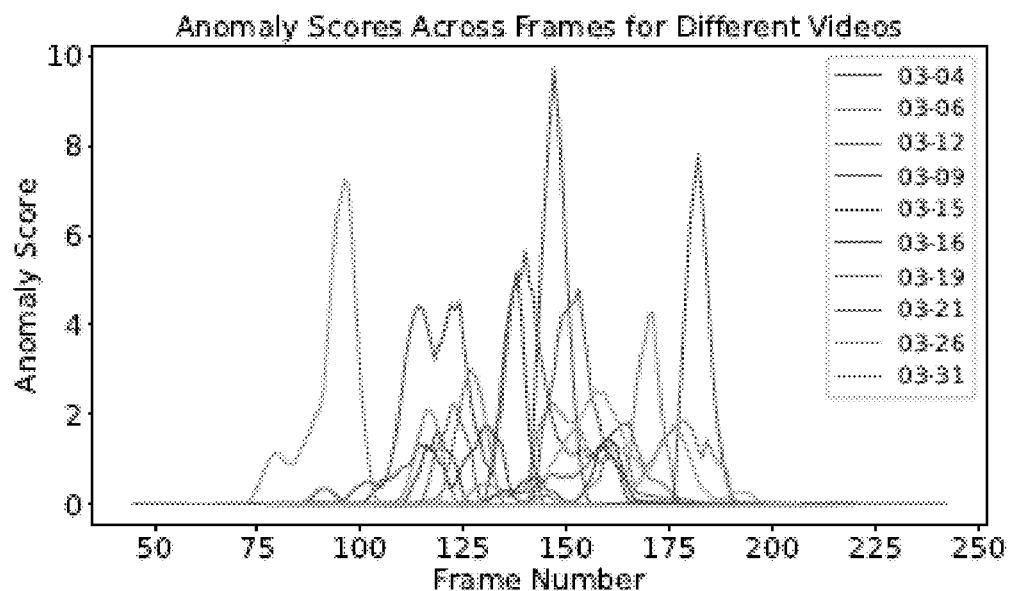
Figure 7D:
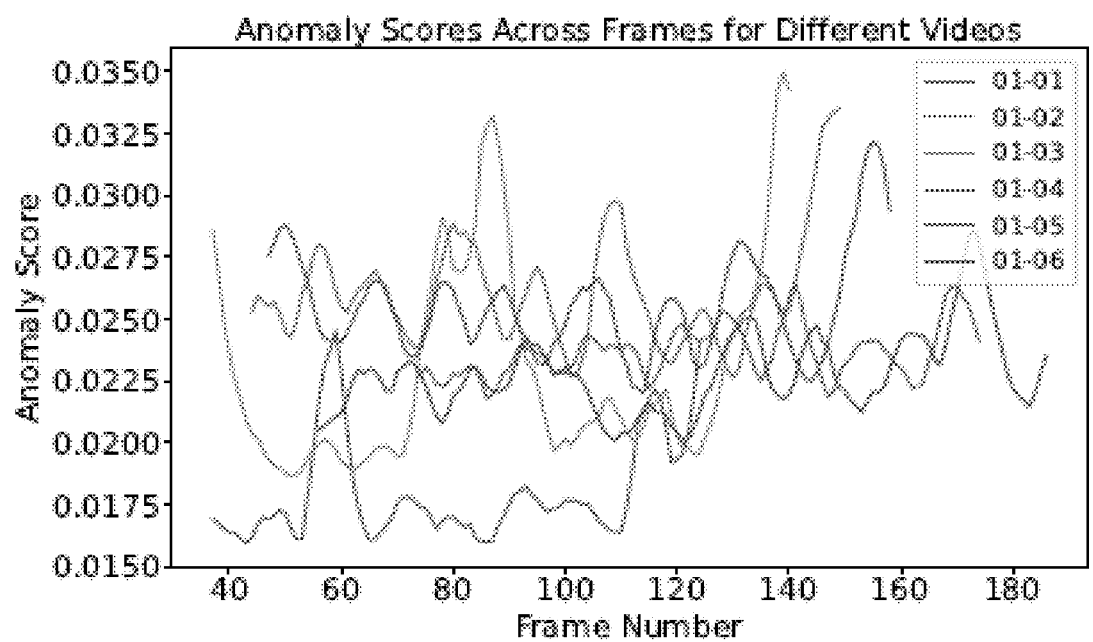
Figure 7E:
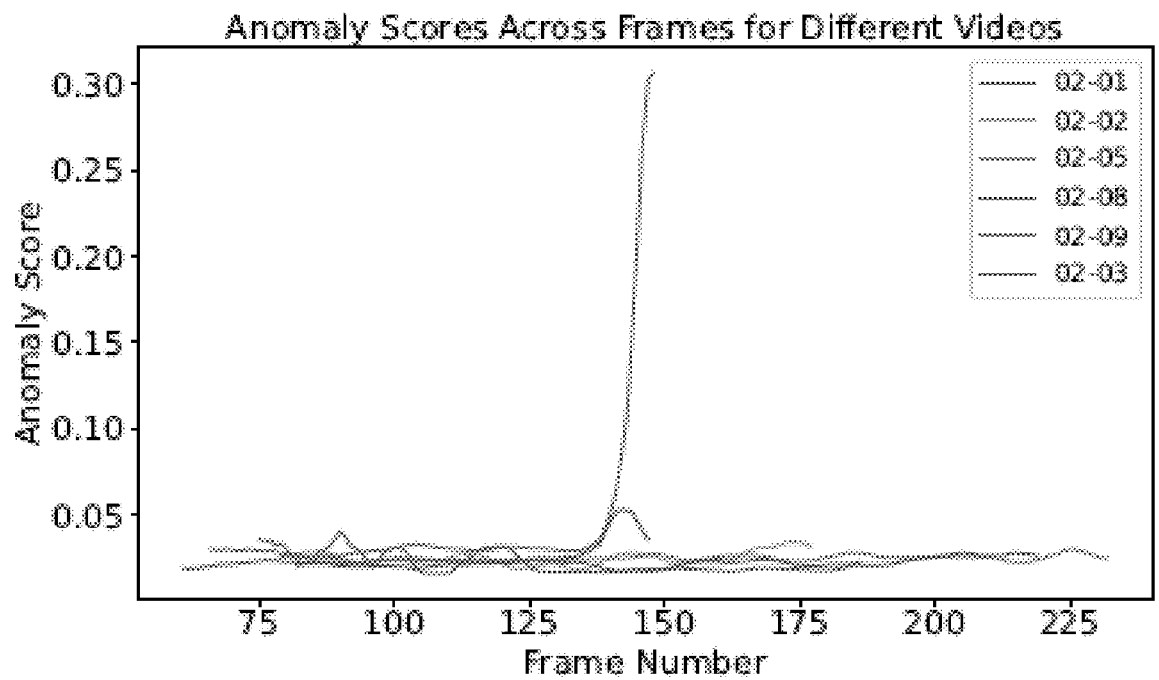
Figure 7F:
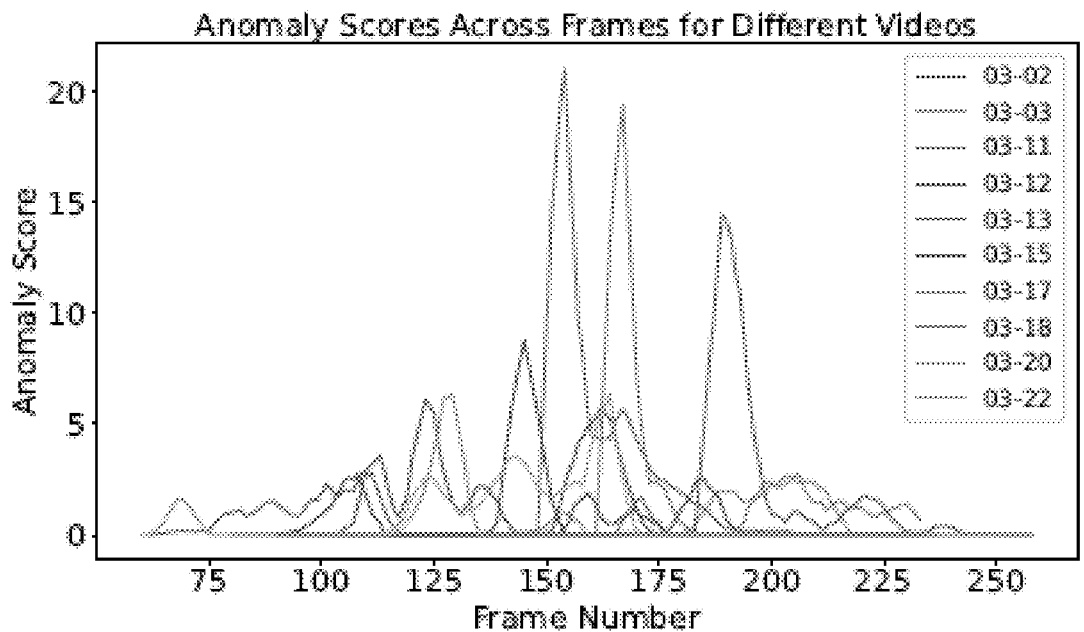

During training, reconstruction loss and noise loss were monitored to evaluate the model's capacity for accurate anomaly detection as shown in FIGS. 6(a)-6(b). Reconstruction loss indicates the model's ability to reproduce normal poses based on learned motion patterns, with lower values reflecting the model's improved capacity to accurately capture and replicate typical human movements. The stabilization of the model is demonstrated by the rolling mean of reconstruction loss over training steps (window size=30), with the model stabilizing after approximately 100 steps, indicating successful convergence on normal pose patterns, as illustrated in FIG. 6(a). Noise loss, on the other hand, measures the model's performance in predicting the random noise added during the forward diffusion process, which is crucial for learning the variability in human movement. A lower noise loss signifies that the model is effectively learning to de-noise and reconstruct realistic poses even under challenging motion conditions. As shown in FIG. 6(b), the rolling mean noise loss decreases rapidly at first and stabilizes by step 700, underscoring the model's ability to predict noise accurately, enhancing its robustness in distinguishing normal from abnormal patterns. To illustrate the skeleton-based diffusion model's ability to differentiate normal from abnormal clips, mean anomaly scores for Scene_02 were presented in FIG. 3. A threshold was set to detect anomalies, enabling the model to correctly identify all abnormal clips, with only one normal clip (video 04) misclassified as abnormal. This false positive, which was likely caused by subtle movements or slightly aggressive postures near the threshold, highlighted the model's reliance on skeletal keypoint data without contextual cues and suggested the benefit of integrating object detection to improve accuracy.

Figure 4A:
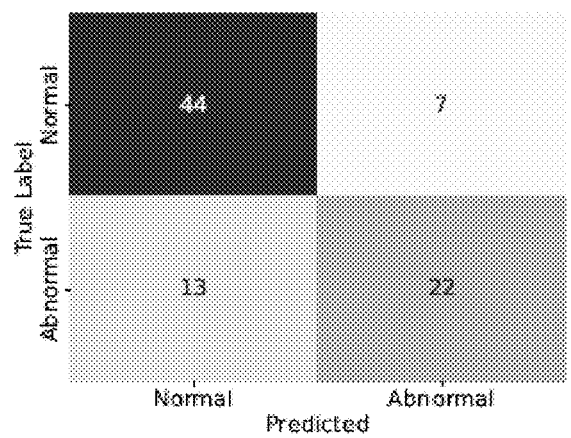
FIGS. 4(a)-4(c) show a comparison of empirical study results of detection accuracy at different stages of the system.
Figure 4B:
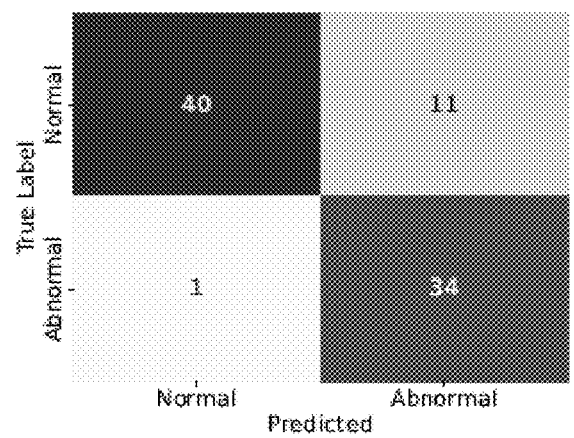
Figure 4C:
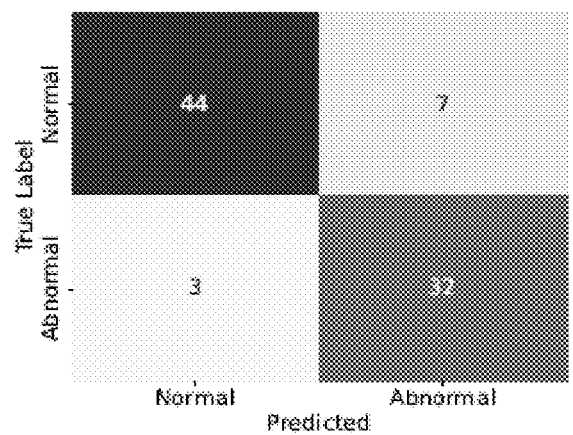

Additionally, the model's performance was evaluated using the Receiver Operating Characteristic (ROC) curve, which demonstrated an average Area Under the Curve (AUC) of 0.677 across 86 video clips in distinguishing normal from anomalous motions. The confusion matrix representing the results of the skeletal motion analysis in FIG. 4(*a*) showed that the model correctly identified 44 normal and 22 abnormal events, with 7 false positives and 13 false negatives. FIG. 4(*b*) shows a confusion matrix generated after applying the unfiltered weapon confidence score and showing that incorporating unfiltered weapon confidence score improves detection to 40 normal and 34 abnormal events, reducing false negatives to one while resulting in eleven false positives. FIG. 4(*c*) shows a confusion matrix generated after applying the filtered weapon confidence score and showing that applying filtered weapon confidence score further refines accuracy, correctly identifying 44 normal and 32 abnormal events, and reducing false negatives to three and false positives to seven. Precision for abnormal detection was 75.86%, recall was 62.86%, and the F1 score was 68.77%, indicating room for improvement in balancing false positives and false negatives.

The performance of the skeleton-based diffusion model for anomaly detection was found to be highly dependent on the characteristics of the datasets used for training and evaluation, as shown in FIG. 11. Datasets with consistent scenes, such as the Firearm-Related Actions and HR-Avenue datasets, yielded stable AUC scores, with HR-Avenue achieving the highest score of 0.864. Conversely, the UCF Crime dataset, characterized by random scenes, exhibited the lowest AUC of 0.493. This outcome underscored the challenges associated with adapting the model to varying scenes, where differences in camera angles and perspectives introduced inconsistencies in posture extraction, thereby complicating the anomaly detection process.

FIG. 12 summarizes the key performance differences observed between the use of filtered and unfiltered weapon confidence scores. Accuracy was increased from 87.5% to 90% when the filtered score was applied, and precision was improved, indicating a reduction in false alarms. This improvement was attributed to the filtering process, which removed false positive weapon detections that were short-lived or inconsistent across frames, thereby reducing the likelihood of normal events being misclassified as abnormal. By considering only weapon detections that persisted over consecutive frames with sufficient spatial overlap, the model's reliability was enhanced, and susceptibility to irrelevant or misclassified objects was decreased. The application of the filtered weapon detection confidence score in the late fusion of detection results and anomaly scores resulted in a slight decrease in recall, indicating that some true positive abnormal cases were missed. This trade-off was due to the exclusion of valid weapon detections that did not meet strict temporal or spatial continuity requirements, such as brief occlusions of the weapon. Nevertheless, the F1 score was improved overall, demonstrating a more effective balance between precision and recall. These results indicated that the filtered weapon detection confidence score achieved superior accuracy and F1 score, providing a practical balance necessary for real-world scenarios where minimizing false alarms is critical without compromising anomaly detection capability.

Anomaly scores were analyzed frame-by-frame across videos within the same scene, as shown in FIGS. 7(*a*)-7(*f*). Anomaly scores were compared only within the same scene to minimize variations in score ranges caused by differences in camera positions and angles, which could distort posture extraction. FIG. 14 displays the mean anomaly scores for different scenes, with clear separation observed between normal and abnormal activities in most scenes. However, in Scene_04, the mean anomaly scores for both normal and abnormal clips were found to be nearly identical.

Figure 8:
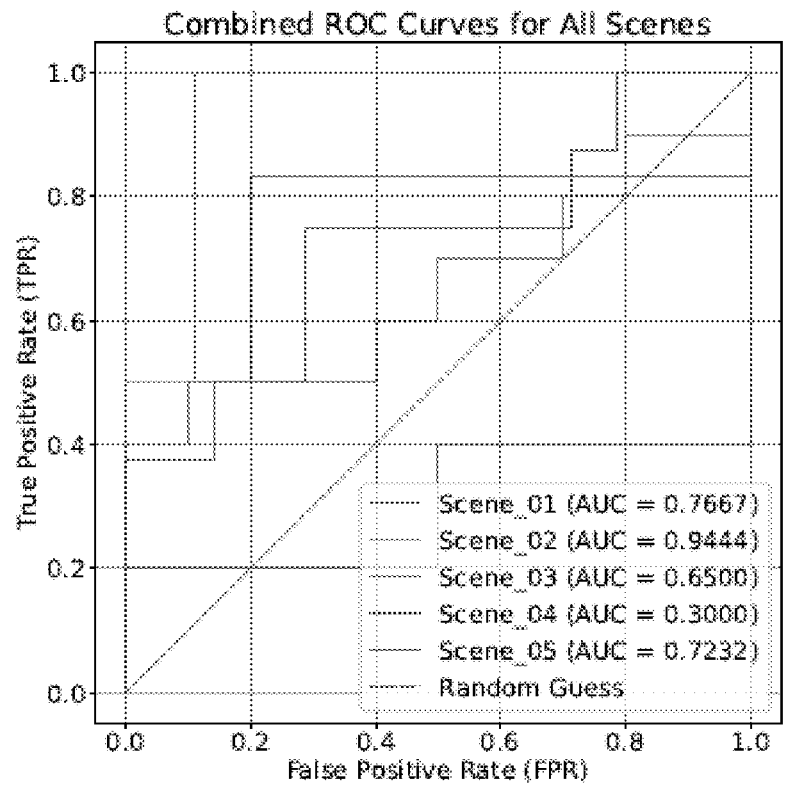
FIG. 8 shows combined Receiver Operating Characteristic (ROC) curves for all scenes, Scene_01 through Scene_05, using the skeleton-based diffusion model. The x-axis represents False Positive Rate (FPR) and the y-axis True Positive Rate (TPR), both ranging from 0.0 to 1.0. A dashed diagonal line from (0,0) to (1,1) indicates "Random Guess." Each scene is depicted by a distinct step-like curve with corresponding Area Under the Curve (AUC) values in the legend: Scene_01 (0.7667), Scene_02 (0.9444), Scene_03 (0.6500), Scene_04 (0.3000), and Scene_05 (0.7232). Scene_02 demonstrates the best performance, reaching TPR of 1.0 at a low FPR. Scene_04 performs worse than random, lying below the diagonal line. The remaining scenes show better-than-random performance with curves above the diagonal. Grid lines aid in visual comparison of the curves.
Figure 9:
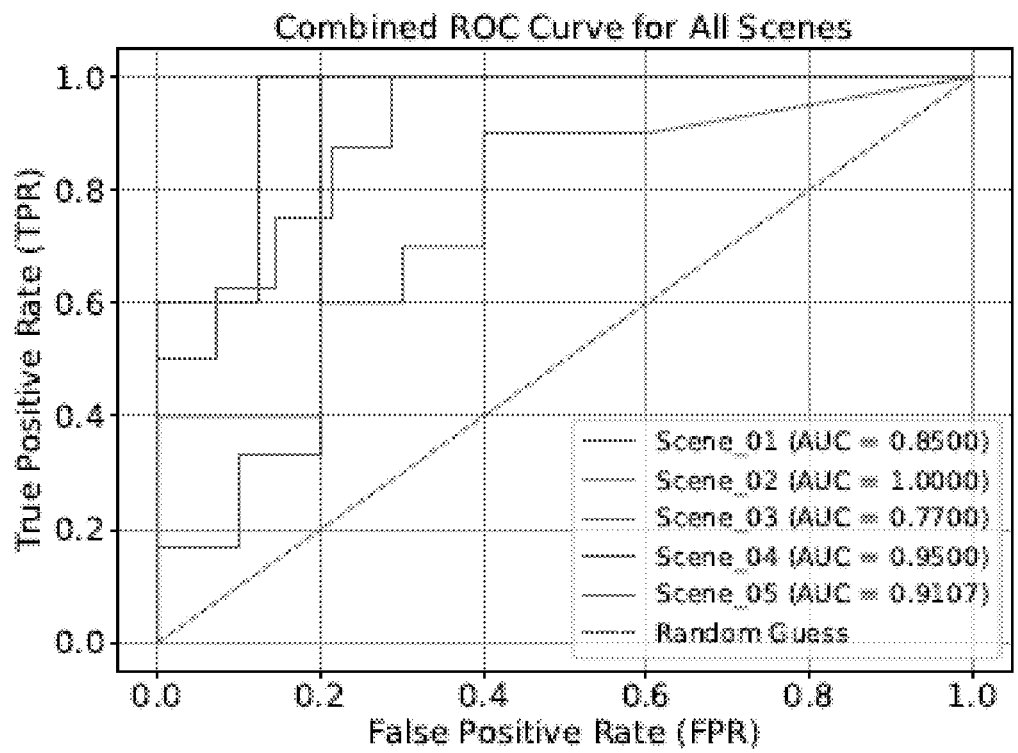
FIG. 9 shows combined ROC curves for all scenes, Scene_01 through Scene_05, using unfiltered weapon confidence. Each scene is depicted by a distinct step-like curve, with AUC values listed in the legend: Scene_01 (0.8500), Scene_02 (1.0000), Scene_03 (0.7700), Scene_04 (0.9500), and Scene_05 (0.9107). Scene_02 demonstrates perfect performance, reaching a TPR of 1.0 at an FPR of 0.0. Scene_04 also performs strongly near the top-left corner. Scenes 01, 03, and 05 show performance significantly better than random, with curves above the diagonal.
Figure 10:
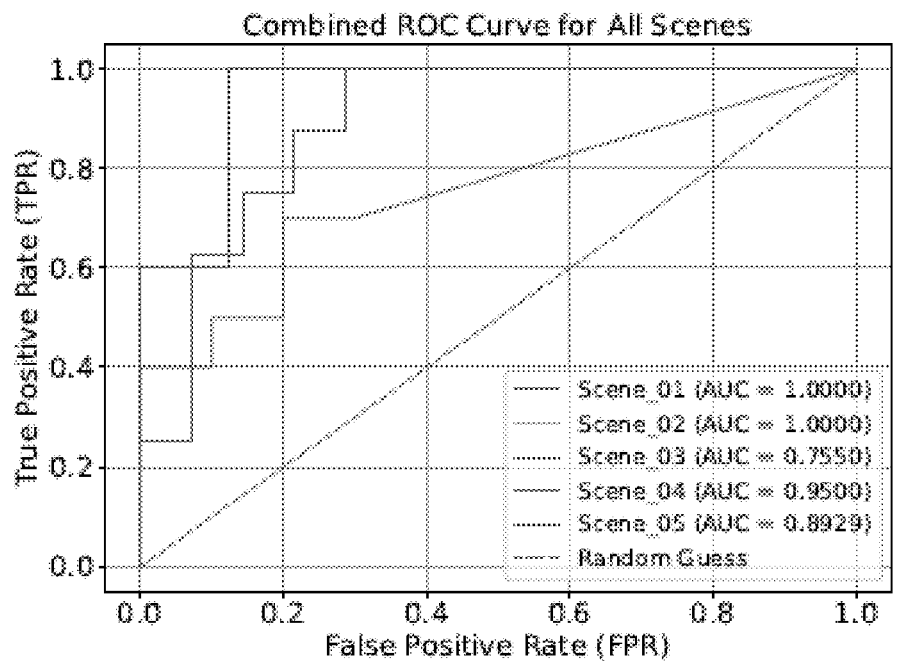
FIG. 10 shows combined ROC curves for all scenes, Scene_01 through Scene_05, using filtered weapon confidence. Each scene is represented by a distinct step-like curve, with AUC values listed in the legend: Scene_01 (1.0000), Scene_02 (1.0000), Scene_03 (0.7550), Scene_04 (0.9500), and Scene_05 (0.8929). Scenes 01 and 02 exhibit perfect performance, reaching a TPR of 1.0 at an FPR of 0.0. Scene_04 performs strongly, remaining near the top-left corner. Scene_05 also shows strong performance, while Scene_03 demonstrates moderate but better-than-random performance, with curves above the diagonal.

The ROC curve and AUC scores for the skeleton-based diffusion model were presented, as shown in FIG. 8. The ROC curve illustrated the model's performance in distinguishing normal from anomalous motions, with an average AUC of 0.677 across 86 video clips (51 normal, 35 abnormal). High AUCs were achieved in Scenes 01, 02, and 05 (0.7667, 0.9444, and 0.7232, respectively), while Scene_04 underperformed, likely due to sub-optimal camera angles. The ROC curve and AUC scores for the framework using unfiltered weapon confidence scores during the late fusion stage were presented, as shown in FIG. 9. The average AUC across 51 normal and 35 abnormal video clips was 89.6%. Additionally, the ROC curve and AUC scores for the framework using filtered weapon confidence scores during the late fusion stage were presented, as shown in FIG. 10. The average AUC score was further improved to 92.0% compared to using unfiltered weapon confidence.

The performance of YOLO was compared with other state-of-the-art object detectors, as shown in FIG. 13. YOLO (ConcatHead), which includes a prediction output concatenation layer within the CNN of the default YOLO architecture, was implemented by freezing the first 22 layers and training only the final detection head responsible for weapon classes. This approach preserved the original knowledge from the COCO dataset and resulted in a high frame rate of 88 frames per second (FPS). However, due to fine-tuning only the last layer, a lower mAP@50-95 of 0.619 was achieved compared to YOLO (default), which attained a higher mAP@50-95 of 0.740 and mAP@50 of 0.921 by retraining all layers. The frozen layers in YOLO (ConcatHead) improved training efficiency but reduced detection accuracy. ResNet50 FPN V2 achieved the highest mAP@50 of 0.929 but at a lower FPS of 47, indicating suitability for applications prioritizing accuracy over speed. In summary, a trade-off between training efficiency and detection accuracy was observed between YOLO (ConcatHead) and YOLO (default). Both models operated at 88 FPS, with YOLO (ConcatHead) sacrificing accuracy due to frozen layers, while YOLO (default) improved accuracy through full retraining.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for privacy-aware weapon anomaly detection via integrated object recognition and skeletal motion analysis, the system comprising:
   a processor; and
   a machine-readable medium in operable communication with the processor and having instructions stored thereon that, when executed by the processor, perform the following steps:
   a) detecting human figures and weapon objects in real time within each frame of an input video using an object detection model;
   b) classifying detected individuals as armed or unarmed by applying a proximity-based target separation technique to associate detected weapon objects with corresponding human figures, and generating a weapon confidence score indicative of the likelihood that a given individual is armed;
   c) anonymizing unarmed individuals by executing a head segmentation module configured to perform a facial masking operation on human figures classified as unarmed based on an absence of associated weapon objects;
   d) identifying abnormal motion patterns by applying a skeleton-based diffusion model to motion data extracted from detected human figures, and generating an anomaly score indicative of a deviation from normal behavioral patterns;
   e) applying a feature refinement module to the weapon confidence score and the anomaly score to generate a refined weapon confidence score and a refined anomaly score, the feature refinement module comprising a plurality of filtering operations; and
   f) applying a fusion process to the refined weapon confidence score and the refined anomaly score to generate a final anomaly score and classifying the input video as normal or abnormal by comparing the final anomaly score to a predetermined threshold.

2. The system according to claim 1, the object detection model in step a) being generated by fine-tuning a pre-trained object detection model by adding a detection head adapted to detect weapon classes including persons, pistols, and rifles, thereby improving threat recognition performance.

3. The system according to claim 1, step (a) comprising:
   detecting one or more weapon objects within the frame of the input video;
   upon detecting at least one weapon object, proceeding to step (b) to classify detected individuals as armed or unarmed based on association with the detected weapon objects; and
   upon detecting no weapon objects, proceeding to step (c) to generate privacy-preserved frames of the input video by anonymizing detected individuals and classifying the input video as normal.

4. The system according to claim 1, the classification in step b) comprising transmitting cropped images of human figures classified as unarmed for anonymization in step c), while retaining images of human figures classified as armed in the original, unaltered form.

5. The system according to claim 1, step c) comprising reinserting anonymized facial regions into corresponding spatial locations of the original frames of the input video, after the anonymization of unarmed individuals, to generate privacy-preserving video outputs for subsequent motion analysis.

6. The system according to claim 1, the identifying of abnormal motion patterns in step d) comprising employing a dynamic thresholding approach tailored to each video scene by accounting for variations in camera locations, angles, and lighting conditions, with step (d) performed only upon detection of a weapon to optimize computational efficiency.

7. The system according to claim 1, the plurality of filtering operations for the weapon confidence score in step e) comprising performing an adaptive filtering mechanism in both temporal and spatial dimensions, where detections are retained only if each detection satisfies a specified minimum Intersection over Union (IoU) and persist across a specified minimum number of consecutive frames, thereby mitigating false positives.

8. The system according to claim 1, the plurality of filtering operations for the anomaly score in step e) comprising performing a selective frame exclusion strategy by utilizing a central 80% of each frame of the input video, with a first 10% and a last 10% of frames discarded to minimize the impact of distortions on the anomaly score and to optimize the reliability and accuracy of pose estimation.

9. The system according to claim 1, the fusion process in step f) comprising employing a multiplication operator to combine the refined weapon confidence score and the refined anomaly score in a late fusion approach for anomaly detection.

10. The system according to claim 1, the predetermined threshold in step f) comprising an experimentally determined threshold that optimally distinguishes normal from anomalous events, thereby providing stable and accurate performance across heterogeneous environments.

11. A method for privacy-aware weapon anomaly detection via integrated object recognition and skeletal motion analysis, the method comprising:
   a) detecting human figures and weapon objects in real time within each frame of an input video using an object detection model;
   b) classifying detected individuals as armed or unarmed by applying a proximity-based target separation technique to associate detected weapon objects with corresponding human figures, and generating a weapon confidence score indicative of the likelihood that a given individual is armed;
   c) anonymizing unarmed individuals by executing a head segmentation module configured to perform a facial masking operation on human figures classified as unarmed based on an absence of associated weapon objects;
   d) identifying abnormal motion patterns by applying a skeleton-based diffusion model to motion data extracted from detected human figures, and generating an anomaly score indicative of a deviation from normal behavioral patterns;
   e) applying a feature refinement module to the weapon confidence score and the anomaly score to generate a refined weapon confidence score and a refined anomaly score, the feature refinement module comprising a plurality of filtering operations; and
   f) applying a fusion process to the refined weapon confidence score and the refined anomaly score to generate a final anomaly score and classifying the input video as normal or abnormal by comparing the final anomaly score to a predetermined threshold.

12. The method according to claim 11, further comprising generating the object detection model by fine-tuning a pre-trained object detection model by adding a detection head adapted to detect weapon classes including persons, pistols, and rifles, thereby improving threat recognition performance.

13. The method according to claim 11, step (a) comprising:
    detecting one or more weapon objects within the frame of the input video;
    upon detecting at least one weapon object, proceeding to step (b) to classify detected individuals as armed or unarmed based on association with the detected weapon objects; and
    upon detecting no weapon objects, proceeding to step (c) to generate privacy-preserved frames of the input video by anonymizing detected individuals and classifying the input video as normal.

14. The method according to claim 11, the classification in step b) comprising transmitting cropped images of human figures classified as unarmed for anonymization in step c), while retaining images of human figures classified as armed in the original, unaltered form.

15. The method according to claim 11, step c) comprising reinserting anonymized facial regions into corresponding spatial locations of the original frames of the input video, after the anonymization of unarmed individuals, to generate privacy-preserving video outputs for subsequent motion analysis.

16. The method according to claim 11, the identifying of abnormal motion patterns in step d) comprising employing a dynamic thresholding approach tailored to each video scene by accounting for variations in camera locations, angles, and lighting conditions, with step (d) performed only upon detection of a weapon to optimize computational efficiency.

17. The method according to claim 11, the plurality of filtering operations for the weapon confidence score in step e) comprising performing an adaptive filtering mechanism in both temporal and spatial dimensions, where detections are retained only if each detection satisfies a specified minimum Intersection over Union (IoU) and persist across a specified minimum number of consecutive frames, thereby mitigating false positives.

18. The method according to claim 11, the plurality of filtering operations for the anomaly score in step e) comprising performing a selective frame exclusion strategy by utilizing a central 80% of each frame of the input video, with a first 10% and a last 10% of frames discarded to minimize the impact of distortions on the anomaly score and to optimize the reliability and accuracy of pose estimation.

19. The method according to claim 11, the fusion process in step f) comprising employing a multiplication operator to combine the refined weapon confidence score and the refined anomaly score in a late fusion approach for anomaly detection, and
    the predetermined threshold in step f) comprising an experimentally determined threshold that optimally distinguishes normal from anomalous events, thereby providing stable and accurate performance across heterogeneous environments.

20. A system for privacy-aware weapon anomaly detection via integrated object recognition and skeletal motion analysis, the system comprising:
    a processor; and
    a machine-readable medium in operable communication with the processor and having instructions stored thereon that, when executed by the processor, perform the following steps:
    a) detecting human figures and weapon objects in real time within each frame of an input video using an object detection model;
    b) classifying detected individuals as armed or unarmed by applying a proximity-based target separation technique to associate detected weapon objects with corresponding human figures, and generating a weapon confidence score indicative of the likelihood that a given individual is armed;
    c) anonymizing unarmed individuals by executing a head segmentation module configured to perform a facial masking operation on human figures classified as unarmed based on an absence of associated weapon objects;
    d) identifying abnormal motion patterns by applying a skeleton-based diffusion model to motion data extracted from detected human figures, and generating an anomaly score indicative of a deviation from normal behavioral patterns;
    e) applying a feature refinement module to the weapon confidence score and the anomaly score to generate a refined weapon confidence score and a refined anomaly score, the feature refinement module comprising a plurality of filtering operations; and
    f) applying a fusion process to the refined weapon confidence score and the refined anomaly score to generate a final anomaly score and classifying the input video as normal or abnormal by comparing the final anomaly score to a predetermined threshold,
    the object detection model in step a) being generated by fine-tuning a pre-trained object detection model by adding a detection head adapted to detect weapon classes including persons, pistols, and rifles, thereby improving threat recognition performance,
    step (a) comprising:
        detecting one or more weapon objects within the frame of the input video;
        upon detecting at least one weapon object, proceeding to step (b) to classify detected individuals as armed or unarmed based on association with the detected weapon objects; and
        upon detecting no weapon objects, proceeding to step (c) to generate privacy-preserved frames of the input video by anonymizing detected individuals and classifying the input video as normal,
    the classification in step b) comprising transmitting cropped images of human figures classified as unarmed for anonymization in step c), while retaining images of human figures classified as armed in the original, unaltered form,
    step c) comprising reinserting anonymized facial regions into corresponding spatial locations of the original frames of the input video, after the anonymization of unarmed individuals, to generate privacy-preserving video outputs for subsequent motion analysis,
    the identifying abnormal motion patterns in step d) comprising employing a dynamic thresholding approach tailored to each video scene by accounting for variations in camera locations, angles, and lighting conditions, with step (d) performed only upon detection of a weapon to optimize computational efficiency,
    the plurality of filtering operations for the weapon confidence score in step e) comprising performing an adaptive filtering mechanism in both temporal and spatial dimensions, where detections are retained only if each detection satisfies a specified minimum Intersection over Union (IoU) and persist across a specified minimum number of consecutive frames, thereby mitigating false positives, the plurality of filtering operations for the anomaly score in step e) comprising performing a selective frame exclusion strategy by utilizing a central 80% of each frame of the input video, with a first 10% and a last 10% of frames discarded to minimize the impact of distortions on the anomaly score and to optimize the reliability and accuracy of pose estimation, the fusion process in step f) comprising employing a multiplication operator to combine the refined weapon confidence score and the refined anomaly score in a late fusion approach for anomaly detection, and the predetermined threshold in step f) comprising an experimentally determined threshold that optimally distinguishes normal from anomalous events, thereby providing stable and accurate performance across heterogeneous environments.

* * * * *